March 15, 1960 H. BÖHM 2,929,014
LIQUID JET ELECTRIC CURRENT CONVERTERS
Filed July 24, 1956 6 Sheets-Sheet 2

Inventor:
Hellmuth Böhm
Toulmin & Toulmin

Inventor:
Hellmuth Böhm
Toulmin & Toulmin

March 15, 1960 H. BÖHM 2,929,014
LIQUID JET ELECTRIC CURRENT CONVERTERS
Filed July 24, 1956 6 Sheets-Sheet 4

Inventor:
Hellmuth Böhm
Toulmin & Toulmin

March 15, 1960 H. BÖHM 2,929,014
LIQUID JET ELECTRIC CURRENT CONVERTERS
Filed July 24, 1956 6 Sheets-Sheet 5

*Inventor:*
Hellmuth Böhm
Toulmin & Toulmin

March 15, 1960     H. BÖHM     2,929,014
LIQUID JET ELECTRIC CURRENT CONVERTERS

Filed July 24, 1956     6 Sheets-Sheet 6

Inventor:
Hellmuth Böhm
Toulmin & Toulmin

United States Patent Office 2,929,014
Patented Mar. 15, 1960

2,929,014

LIQUID JET ELECTRIC CURRENT CONVERTERS

Hellmuth Böhm, Berlin-Charlottenburg, Germany, assignor to Licentia Patent-Verwaltungs-G.m.b.H., Hamburg, Germany Application July 24, 1956, Serial No. 599,871

Claims priority, application Germany July 27, 1955

7 Claims. (Cl. 321—50)

This invention relates to improvements in centrifugal-pump type liquid-jet converters; it relates more particularly to a new and useful contact arrangement in a liquid-jet converter.

Centrifugal-pump type liquid-jet converters are well known in the art, and comprise a number of solid contact members arranged stationary in a circle about a centrally disposed rotary contact element which ejects at least one jet of an electrically conductive liquid such as mercury against the solid contact members.

Electric current converters of this type are preferably used as inverted or D.C.-A.C. converters. Gaps are normally provided between the stationary contact members so that no current flows through the converter when the rotary contact element passes from one to another contact member of the contact circle. It is customary in the art to maintain the supply of current, and consequently the voltage in inverted converters by using bridging condensers, while in the case of the converter being used as an A.C.-D.C. rectifier, the gaps are bridged by providing each jet producing leg of the rotary contact element with two liquid ejection nozzles. Converters provided with gap bridging means of these known types suffer from a lack of voltage stability. Thus, the distance between two electrodes cannot be increased at random since, if the gaps become too large, the resulting voids in the current contribute to a lack of voltage stability. This is a serious drawback in particular of inverted converters, when high frequencies are to be obtained. On the other hand, rotating droplets of mercury make it necessary to provide minimum distances between the contacts in order to guarantee exact commutation.

It is an object of my invention to provide for an arrangement of contact elements in a centrifugal-pump-type liquid-jet converter imparting to the voltage derived from the same a high degree of stability.

It is another object of my invention to provide an arrangement of contacts in a centrifugal-pump-type jet converter which permits to obtain uninterrupted currents and voltages while the contact members being spaced by considerable larger gaps than usual.

It is a further object of my invention to provide for an arrangement of the contact elements in a centrifugal-pump-type liquid-jet converter which permits to achieve a very exact commutation, while maintaining gaps of satisfactory width between the individual stationary contact members.

It is yet another object of my invention to provide for an arrangement of the contact elements in a centrifugal-pump-type liquid-jet converter, whereby converters of relatively small size are capable of rectifying or producing, as the case may be, voltages in the order of 220 to 380 volts and more, while at the same time permitting a reduction in the speed of the rotary contact element.

The above mentioned drawbacks of the known types of electric current converters are avoided, and the aforesaid objects achieved by the improvements in such converters according to my invention which comprises a new contact arrangement, wherein the jet producing legs of a rotary contact element are so disposed relative to the stationary, circumferentially arranged contact members, that only half the number of contacting liquid-jets or less than half the total number of jets are directed, at a certain instant, against the stationary contact, while simultaneously the remaining jets are directed toward the gaps between the contacts. This arrangement according to the invention permits a construction of the circular group of stationary contacts with large gaps between adjacent contacts while, at the same time, the converter is capable of producing a direct or an alternating current, as the case may be, which is practically free from voids and therefore shows an excellent voltage stability.

Due to the permissible large gaps between adjacent contact members in the stationary contact circle, the voltage range for which a liquid-jet current converter provided with the contact arrangement according to the invention is considerably increased over the ranges hitherto permissible in the art. Relatively small converters can now be used for producing direct or alternating currents with voltages in the order of 220–380 volts and higher, without any difficulty. Very exact commutation effects are achieved by a correspondingly exact construction of the rotary centrifuge member and the stationary contacts. The arrangement according to the invention achieves exact commutation by making it possible that one liquid-jet breaks contact with a stationary contact member at exactly the same instant that another liquid-jet makes contact with another stationary contact member.

Furthermore, and in particular when using a four-leg centrifuge member, it is possible to considerably reduce the speed of the centrifuge, while maintaining or even increasing the width of the gaps between adjacent stationary contact members.

It is a characteristic feature of my invention that the arrangement of contacts depends on certain requirements. For instance, if a multiphase alternating current having an odd number of phases is to be produced or rectified all contact members are of equal width, all gaps are of equal width, and all contact members have the same width as the gaps. In the case of an even number of phases and a two-legged centrifuge element, one contact must be halved and the two halves must be arranged somewhat displaced from a position exactly opposite each other, but still opposing each other partially. If a four-legged centrifuge is used, the gaps between contacts may have at least twice the width of the contacts which latter are all of the same width. The contact arrangement according to the invention permits to obtain interlinked voltages without requiring overlapping contact members; rather a satisfactory gap width between all contact members can be maintained.

In a preferred embodiment of the invention an additional liquid-jet in excess of the number of jets being directed against stationary contact members, is also directed against a stationary contact member, thereby, a determined overlapping effect is achieved which permits to approximate the configuration of the alternating voltage produced by an inverted converter having the contact arrangement according to the invention, more to the ideal sine curve, while in the case of the converter being used as a rectifier, the direct voltage is better smoothed than in the case of the conventional contact arrangements.

The above described features of the invention will be better understood by the following description of the invention in connection with the accompanying drawings in which

Figure 16 illustrates a wiring system comprising the preferred embodiment of the contact arrangement according to the invention as illustrated in Figures 9 and 9a;

Figures 1, 1A:
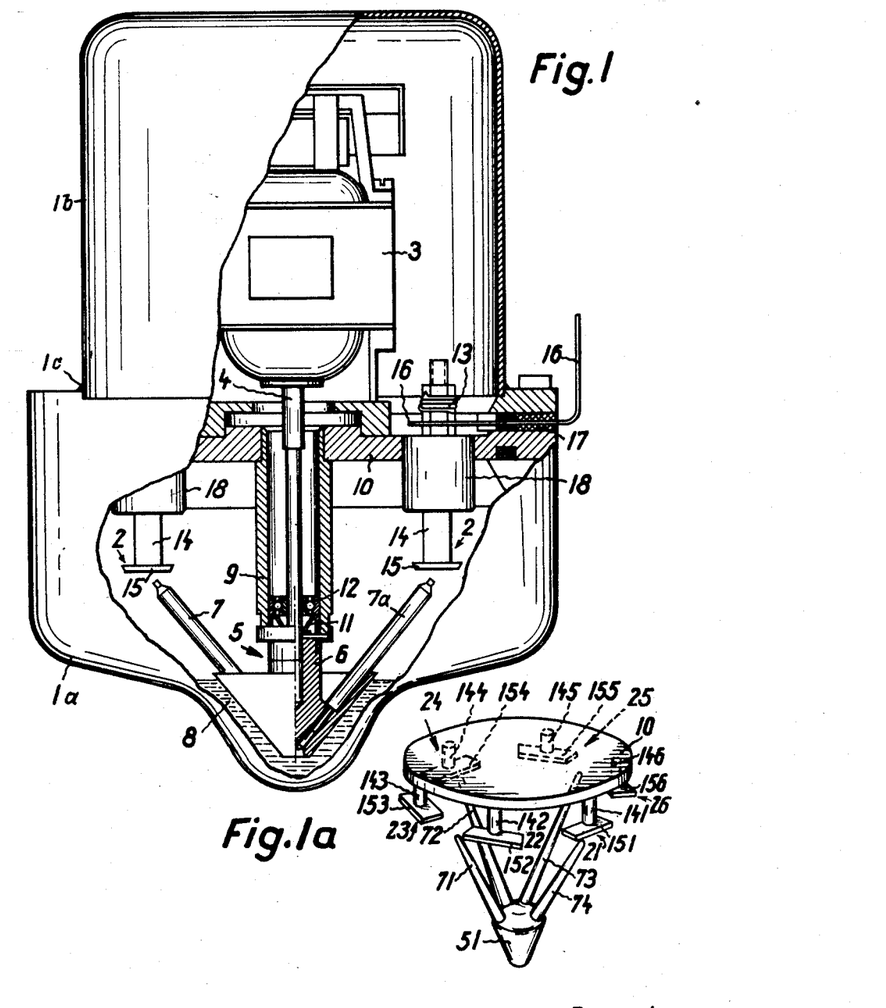
Figure 1 is a partially sectional front view of a conventional electric current converter having a known contact arrangement.
Figure 1a is a perspective view of a preferred embodiment of the contact arrangement according to the invention to be used with the electric current converter shown in Figure 1.

More in detail, the conventional electric current converter illustrated in Figure 1 comprises a casing consisting of a lower half 1a and an upper half 1b hermetically sealed together at 1c. The lower half 1a houses a contact arrangement comprising contact members 2 circularly arranged in a horizontal plate 10 separating the upper from the lower part of the casing. The upper half 1b of the casing 1 houses a motor 3. The motor shaft 4 extends downwardly through a central opening in plate 10 toward the bottom of lower casing half 1a, and bears at its lower end a rotary element 5 comprising the centrifuging cone 6, which bears two jet producing legs 7 and 7a. The centrifuging cone 6 dips into an electrically conductive liquid 8 such as mercury, filling a central bottom portion of the lower casing half 1a. The portion of shaft 4 extending below plate 10 is surrounded by a sleeve 9 mounted at its upper end in the aforesaid central opening of plate 10. At its lower end, sleeve 9 contains bearing means 12 such as a ball bearing for guiding shaft 4, and sealing means such as a clamping and sealing ring 11. The lead-in 16 passes through a rubber insulating ring 17 to the terminal 13 of each contact electrode to 2. Each of these electrodes consists of an electrode holder 14 to which an electrode plate 15 which is, for instance, a small slab of tungsten, is attached by means of a screw connection or soldering.

The two mercury jet producing legs 7 and 7a are mounted in the centrifuging cone 6 symmetrically opposite each other. This permits to apply a considerable electric load to a converter of this type. The contact arrangement according to the invention as illustrated in a perspective view in Figure 1a comprises a circularly arranged number of contact electrodes 21 to 26. Each of these electrodes is mounted by means of a socket 141 to 146 respectively in the intermediate plate 10 of a converter as illustrated in Figure 1. A tungsten electrode plate 151 to 156 respectively is attached to the lower end of each socket 141–146.

The rotary element used with this assembly of stationary contacts 21—25 is a four-legged centrifuge cone member 51 bearing symmetrically arranged legs 71, 72, 73 and 74. This centrifuge takes the place of centrifuge member 6 in the apparatus shown in Figure 1.

In the following figures of the drawings, only the circularly arranged electrode plates and the legs of the central rotary centrifuge element are represented schematically. Thus, the arrangement illustrated in Figure 1a is also shown, schematically, in Figure 8, and shall be further discussed hereinafter.

Figure 2:
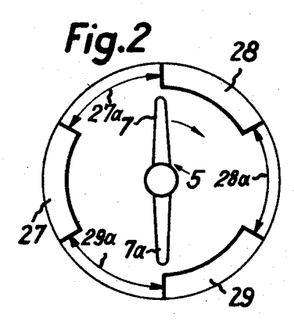
Figures 2 and 3 show in a schematic top view another embodiment of the contact arrangement according to the invention with two different positions of a two-legged rotary centrifuge element.
Figure 3:
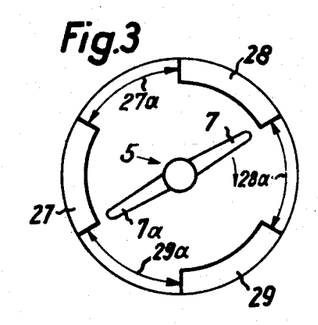

According to another embodiment of the invention illustrated in Figures 2 and 3, the rotary centrifuge element 5 is provided with two legs 7 and 7a in the same manner as in Figure 1. The contact arrangement according to the invention is obtained by distributing three stationary contact members, 27, 28 and 29 in such a manner in a circle, that they have an angular displacement of 120° relative to each other.

Each of the contact members 27, 28 and 29 as well as the intermediate gaps 27a, 28a and 29a is of the same width corresponding to a central angle of 60°. In Figure 2 centrifuge leg 7 is about to establish contact by directing its mercury jet against contact member 28, while the jet from leg 7a is about to break contact with contact member 29.

In Figure 3, the centrifuge has rotated about an angle of 60°, so that leg 7 is about to break contact with contact electrode 28, while leg 7a is about to make contact with electrode 27. In accordance with the invention, the mercury jet from leg 7a is directed into the gap 29a, while leg 7 makes contact with electrode 28, while the mercury jet from leg 7 is directed into gap 28a while leg 7a makes contact with electrode 27. Upon further clockwise rotation of centrifuge 5, as indicated by an arrow in Figures 2 and 3, the jet from leg 7a is directed into gap 27a, while leg 7 makes contact with electrode 29 etc. In a 50-cycle system, the centrifuge must be rotated at a speed of 1500 r.p.m. Since the gaps 27a, 28a and 29a are of the same width as the contact electrodes 27, 28 and 29, the distance between the three contacts is so large that a high voltage range is permissible, when using a liquid-jet converter with the contact arrangement according to the invention.

Figure 4:
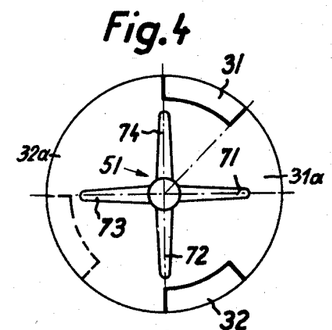
Figure 4 shows schematically another contact arrangement according to the invention comprising a four-legged rotary centrifuge member.

Figure 4 illustrates another embodiment of the invention which comprises the four-legged rotary element 51 as shown in Figure 1a, and two stationary electrodes 31 and 32. Each of these electrodes has an angular opening of 45°, while the gap 31a between these electrodes is twice as wide, and the gap 32a between these electrodes is four times as wide as the aforesaid electrodes. This embodiment may be used for a two-phase system or for a monophase fullwave inverter or rectifier. A current converter of this type may be operated at a speed of 750 r.p.m, i.e., at half the speed as the converter illustrated in Figure 2.

Figure 5:
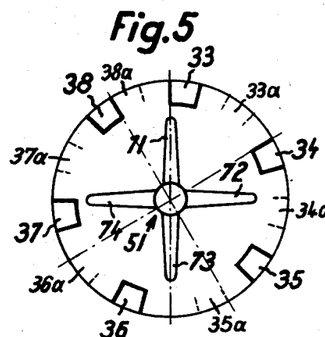
Figure 5 shows schematically a further contact arrangement comprising the same type of rotary element as Figure 4.

Figure 5 shows schematically a contact arrangement for the same type of four-legged centrifuge member 51, rotating at 750 r.p.m. but in a six-phase contact arrangement according to the invention. This arrangement comprises the contact electrodes 33 to 38, and between these electrodes gaps 33a, 34a, 36a, and 37a, having three times the width of the electrodes, each of which corresponds to an opening angle of 15°, while gap 35a is four times as wide, and the gap 38a, located diametrically opposite gap 35a, is only twice as wide as each contact member. However, each of these gaps is at least twice as wide as each contact member.

Figure 6:
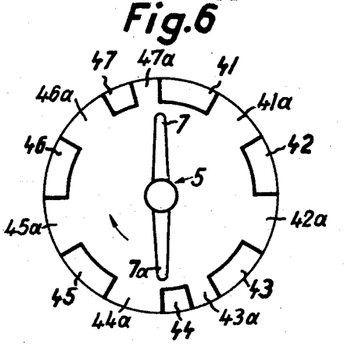
Figures 6 and 7 show another embodiment of the contact arrangement according to the invention comprising a two-legged centrifuge member shown in two different positions.
Figure 7:
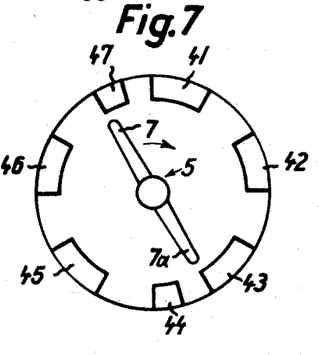

In Figures 6 and 7 another contact arrangement according to the invention for a six-phase current converter is shown in which five of the contact members are of equal width each having an angular opening of 30°, while one further contact member is subdivided so as to form two contacts of smaller width corresponding to an angular opening of 15° only, whereby a relatively wide gap between adjacent contacts is made possible, although this six-phase converter is operated with a two-legged rotary element 5. Contact members 41, 42, 43, 45 and 46 correspond as to arc width to gaps 41a, 42a, 44a, 45a and 46a, while contact members 44 and 47 correspond in width to gaps 43a and 47a.

In Figure 6 leg 7a of centrifuge member 5 is about to break contact with the halved contact member 44, while leg 7 is about to make contact with contact member 41.

In Figure 7 contact member 7 is about to make contact with electrode 47, while leg 7a is about to break contact with electrode 43, clockwise rotation being assumed. At all instances, one of the two legs 7 and 7a will direct its liquid-jet against one of the electrodes 41 to 47, while the oppositely directed liquid-jet from the other electrode is directed into one of the gaps 41a to 47a.

All contact arrangements illustrated in Figures 2, 3, 6 and 7 are further characterised by the fact that diametrically opposite each contact member there is located a gap of the same width as the contact member, while in the arrangements shown in Figures 4 and 5 these gaps are at least twice as wide as the contact members.

Figure 8:
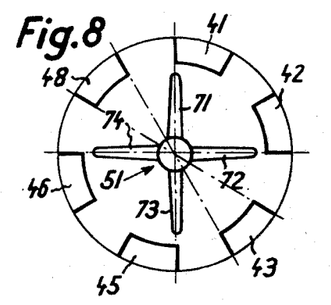
Figure 8 shows a similar basic contact arrangement as Figure 5 but with wider and regularly distributed stationary contact members.

Figure 8 illustrates a further embodiment of the invention in which a four-legged centrifuge member 51 is to operate at a speed of 750 r.p.m. in a three-phase current converter. Contact members and gaps are displaced at an angle of 60° relative to the next following contact members or gaps, and all contact members and gaps are of the same angular opening of 30°, while two of the four legs make contact, as for instance, legs 71 and 73 with regard to contacts 41 and 45, the two other legs 72 and 74, disposed at right angle to the aforesaid pair of legs, break contact with members 42 and 46, and begin to direct their mercury jets into the gaps between contact elements 42 and 43 on the one hand, and 46 and 48 on the other hand. The contact members are numbered 41 to 43, 45, 46 and 48. This arrangement permits to increase the current load without decreasing the voltage stability of the converter.

Figure 9:
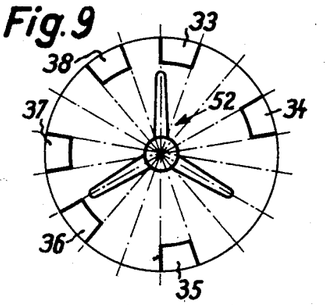
Figures 9 and 10 show further embodiments of the contact arrangement according to the invention comprising a three-legged rotary element.
Figure 10:
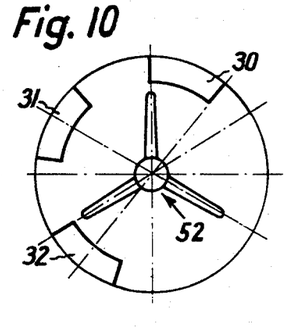

Figures 9 and 10 illustrate contact arrangements comprising three-legged centrifuges 52.

Figure 9 illustrates a six-phase converter system, and Figure 10 a three-phase converter system. Again, the gaps between contact members are at least as wide as an adjacent contact. The required speed of the rotary element is 1000 r.p.m. Contacts 30, 31 and 32 in Figure 10 have nearly the same width as those in Figure 4 (about 45°) and contacts 33 to 38 have an angular width of 20°. The arrangement of these contact members along the periphery of the contact circle is different.

The various embodiments show that a subdivision of a contact member can be avoided, if the centrifuge member is provided with more than two legs. If, on the other hand, a two-legged centrifuge member is used in a multiphase converter of an even number of phases, one of the contact members must be subdivided as illustrated in the embodiment of Figures 6 and 7.

Figure 11:
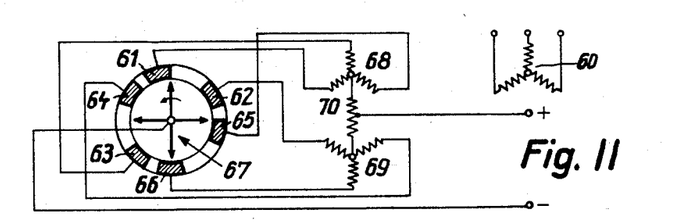
Figure 11 shows a further similar contact arrangement as Figures 5 and 8 in a wiring diagram comprising a rectifier transformer.

A complete wiring diagram comprising a contact arrangement according to the invention similar to the embodiment shown in Figure 8 is schematically represented in Figure 11. The contact arrangement is housed in a casing of the type illustrated in Figure 1, and comprises stationary contact electrodes 61 to 66, arranged about the periphery of a contact circle in a manner similar to that shown in Figure 8, but somewhat displaced so as to group the six contact electrodes in pairs 61—62, 63—64, and 65—66 with narrower gaps (angle of 15°) between two electrodes forming a pair and wider gaps (angle of 45°) between the pairs. A four-legged centrifuge member 67 is assumed to rotate counter-clockwise at a speed of 750 r.p.m. corresponding to a 50-cycle system. Lead-ins are provided to these electrodes in the same manner as illustrated in Figure 1. Two three-phase secondary windings of Y-connection 68 and 69 are connected with their free coil ends each to one stationary contact member of the contact circle, while the neutral connections of Y-connected secondaries 68 and 69 are connected with each other via a corresponding coil 70. The phase windings of secondaries 68 and 69 are electrically displaced relative to each other by an angle of 60°. One direct voltage pole, such as the positive pole in Figure 11 is connected to the central point of the coil 70, while the other direct voltage pole is connected to the center of the centrifuge 67 which dips into the mercury sump 8 at the bottom of the casing, shown in Figure 1. This casing is usually of iron and therefore in conductive contact with the mercury sump 8, the casing thus acting as the negative pole. The same applies if this converter is used as a rectifier.

Figure 11 illustrates a contact arrangement in which contact is made during an electric angle of 120°, each contact member having an opening angle of 30°.

Reference numeral 60 designates a three-phase Y-connected primary which forms the output side for the resulting three-phase alternating current.

Figure 11A:
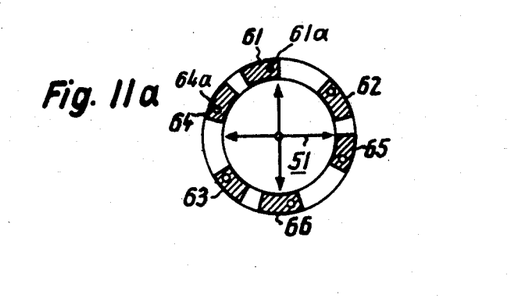
Figure 11a shows a method of mouting the stationary contact members of the arrangement illustrated in Figure 11.

In order to simplify the mounting of the contact members which are irregularly distributed around the contact circle as illustrated in Figures 11 and 11a, the contact holders connecting the tungsten plates 61 to 66 are asymmetrically disposed in these plates, but consequently distributed at an angle of 60°, i.e., regularly about the contact circle, thus assuring a simplified manufacture of the same. Thus holder 61a is displaced to the right side of electrode plate 61 while contact holder 64a is displaced toward the left side of electrode plate 64.

Figure 12:
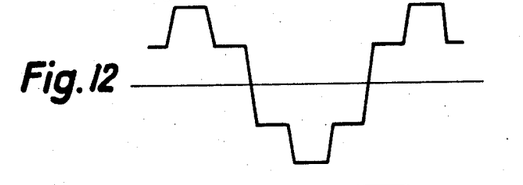
Figure 12 illustrates an alternating voltage curve between two phases produced at the output terminals of a conventional inverted converter of the type illustrated in Figure 1.

The following Figure 12 shows a voltage curve between two phases on the output side of an inverted converter comprising a conventional contact arrangement as illustrated in Figure 1.

Figure 13:
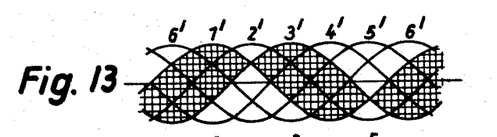
Figures 13, 14 and 15 illustrate voltage curves obtained at the output side of an inverted converter comprising a contact arrangement according to the invention.

Figure 13 shows one of the interlinked voltages taken off from the input side of the circuit shown in Figure 11 as a rectifier.

Figure 14:
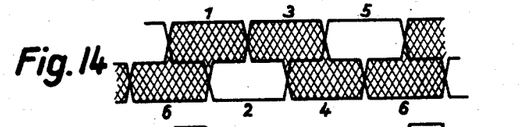

Figure 14 shows the interlinked voltage during operation as an inverted converter. No voltage differences occur between simultaneously conductive phases so that no saturated coil 70 is required, although use of the same improves the shape of the curves.

Figure 15:
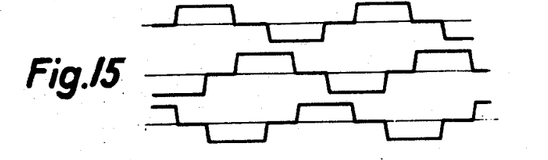

The voltage curves shown in Figure 15 are obtained when using delta-connected secondaries. As can be seen from these curves, interlinked voltages can be produced without requiring overlapping contacts.

Figure 16:
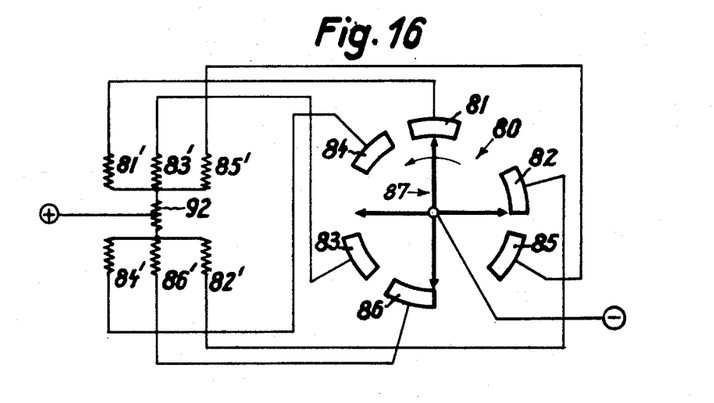

In Figure 16, a preferred embodiment 80 of the contact arrangement according to the invention is incorporated in a schematically represented current converter circuit.

In this circuit the stationary contact members are numbered 81 to 86, each of which is connected with a phase winding 81' to 86' of the transformer primary, the secondary not being further represented. The circuit comprises a coil 92. The four-legged centrifuge 87 is adapted to make a quarter revolution during one period. Correspondingly, the electric width of the contacts is somewhat greater than 120°. The windings of the transformer secondaries which are arranged one below the other are magnetically arranged on the same core leg. All of them have equal numbers of winding. The centrally located coil 92 has an instantaneous voltage designated as $u_s$. Rotation of the centrifuge member 87 is assumed to be counterclockwise. The coil circuit is used as a rectifier circuit.

Figure 17:
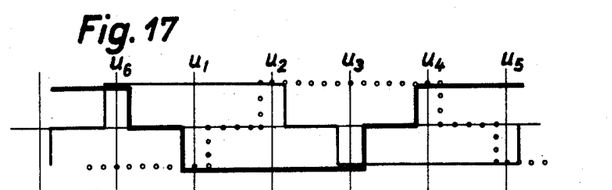
Figures 17 to 21 illustrate several voltages existing in the circuit diagram of Figure 16.

If this circuit is used for the purpose of inverted conversion, the supplied direct voltage to be converted to alternating voltage is constant. The following types of voltages are obtained:

A diametric voltage, as illustrated in Figure 17. This voltage prevails, for instance, between contact members 83 and 86 in Figure 16. It can be seen easily that the phase voltages in the above mentioned example of Figure 17 overlap by about 20°.

Figure 18:
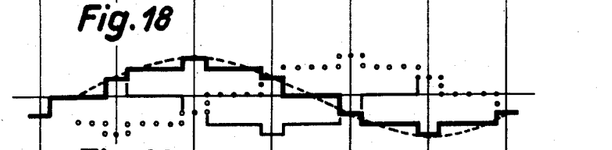

A phase voltage designated as $u_1$. This voltage is illustrated in Figure 18 and approximates in steps the shape of an ideal sine curve indicated by a phantom line. The other phase voltages are indicated by a dash-dotted and by a dotted line and are complemented correspondingly. These other phase voltages are generated on the secondary winding not shown in Figure 16 when operating the circuit as an inverted converter circuit. It must be borne in mind in reading these curves, that the Y-connected winding portions such as $82'$ and $86'$ corresponding to contact members 82 and 86, are connected in parallel during commutation and/or overlapping. The magnetic flux through coil $81'$ is divided into two halves flowing through coils $82'$ and $86'$, and flows from contact members 82 and 86 back to contact member 81 and coil $81'$. Consequently, the voltage in the coils $82'$ and $86'$ is only half as large as that flowing through coil $81'$.

Figure 19:
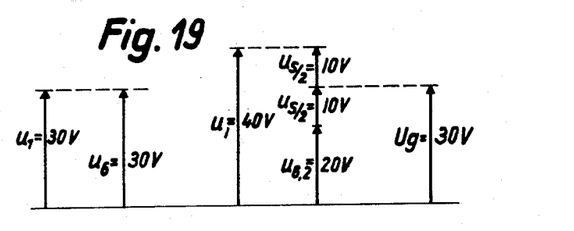

These relations are separately illustrated in Figure 19. In this diagram, direct voltage $u_g$ is indicated as being 30 volts. To the left thereof there are represented the vectors $u_1$ and $u_6$ which receive the full voltage of 30° from the transformer coils $81'$ and $86'$, since the coil voltage $u_s$ is normally equal zero. The conditions prevailing during commutation are represented in the middle portion of Figure 19. Voltage $u_1$ is 40 volts and consequently twice as large as voltage $u_{6,2}$ which is only equal to 20 volts for the reasons set forth above during the time of commutation. The saturated coil receives, at this moment, the difference of 2×10 volts. Since the direct voltage is taken off in the center of the coil, the phase voltage of the non-commuting phase must be increased by one third, while the voltages of the commuting phases are decreased by one third. This explains the voltage increases in the middle portion of curve 1 in Figure 14 and the stepwise voltage decreases in the ascending and descending branches of that curve.

Figure 20:
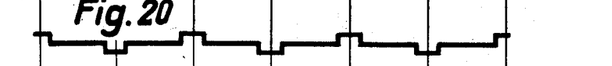

Figure 20 illustrates the coil voltage which smooths the rectangular changes in the curves shown in Figure 17, as can be seen in Figure 18. By a corresponding overlapping, the step-shaped curve of Figure 17 can be approximated to a sine curve in the manner illustrated in Figure 18. During the periods of overlapping no short circuiting due to overlapping occurs, as is frequently the case in the known contact arrangements of rectifiers. The shifting of the electric currents has not been taken into consideration in the above discussions, but is carried out in a conventional manner, for instance, by using condensers compensating cos $\varphi=1$ in the case of inverted converters. Since inverted converters of the mercury jet type are not very sensitive to interruptions of the current, these condensers need not be tuned exactly to a commutation without arc formation.

Figure 21:
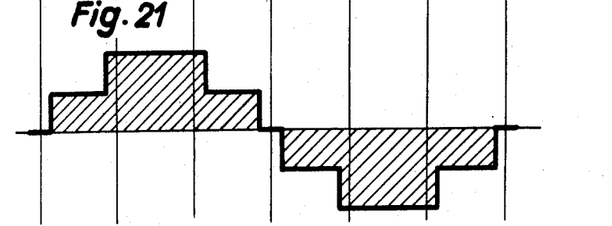

If curves $u_1$ and $u_6$ are added, there results an interlinked voltage in the secondary of the transformer as illustrated in Figure 21. The secondary windings of the transformer may also be delta-connected.

The above mentioned overlapping may also be effected by providing a double jet for each centrifuge leg and maintaining the same width of the contact members as described in Figure 2 through 11a.

Figure 22:
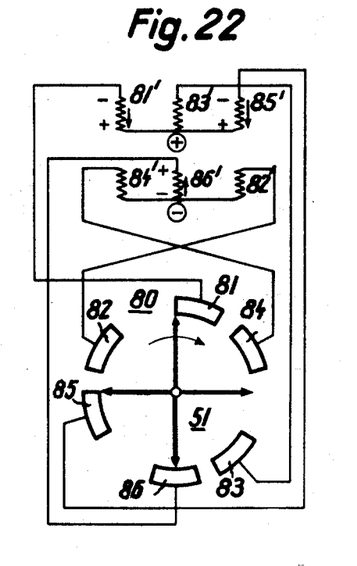
Figure 22 illustrates a modified circuit diagram similar to that of Figure 16.

Finally, the circuit described in Figure 16 may also be used for rectification as well as inverted conversion. This type of circuit is illustrated in Figure 22. The resulting voltage relationships are very similar to those prevailing in the coil circuit. It is, however, necessary to displace one of the Y-connections by a phase angle of 180°, as this has been done in the case of the lower Y-connection comprising coils $82'$, $84'$ and $86'$. The positive and negative direct current leads are then connected to the neutral connections of both Y-connected transformer windings, and the mercury jet converter provides the necessary contacts without having a direct current connection. The potential of the converter casing is in the center of the direct voltage. Therefore, the apparatus may also be used as a voltage divider in direct current networks. A special advantage of this circuit resides in the fact that at a direct voltage equal to that of the coil circuit of Figure 16, the commutating voltage, i.e., the voltage between commutating electrodes, is only half as large as that occurring in the saturated coil circuit. It is therefore possible to operate current converters of approximately 300 volts direct voltage without any special auxiliary commutating means, since the magnitude of the commutating voltage is in the same range as the arc voltage of mercury.

It will be understood that this invention is susceptible to modification in order to adapt it to different usages and conditions and, accordingly, it is desired to comprehend such modification within this invention as may fall within the scope of the appended claims.

What I claim is:

1. A system for converting electric currents comprising: A multi-phase liquid jet converter having a casing the bottom portion of which contains a sump of an electrically conductive liquid; an arrangement of a multi-legged centrifuge member dipping into said sump, and having symmetrically disposed legs, and a plurality of solid, stationary contact members arranged in a contact circle with gaps between adjacent members, said contact members being so distributed about the periphery of said circle that up to half the number of liquid jets produced by the legs of said centrifuge member are directed each against one of said solid contacts, while the remaining jets are directed into said gaps between said contact members; a transformer having a primary and a secondary side; two Y-connected groups of windings on one of said transformer sides; pairs of branches of said Y-connected groups of windings being coupled in counter-phase with a phase winding on the other side of said transformer and connected to two of said contact members, having a gap therebetween, which has up to half the width of said contact members; and a direct voltage source connected to the neutral connections of said two Y-connected groups of windings.

2. In a liquid-jet electric current converter, having a casing whose bottom portion contains a sump of an electrically conductive liquid, in combination, the arrangement of a multi-legged centrifuge member having at least three symmetrically disposed legs, and a plurality of stationary contact members, arranged in a contact circle with gaps between adjacent members, said contact members being distributed in such a manner about the periphery of said circle that during rotation up to half the number of liquid jets centrifuged by the legs of said centrifuge member are directed each against one of said contact members, while the remaining jets are directed into gaps between said contact members, thereby imparting to the voltage derived from the converter a high degree of stability, while maintaining the necessary minimum distance between said contact members.

3. In a liquid-jet electric current converter adapted to an even number of voltage phase, having a casing whose bottom portion contains a sump of an electrically conductive liquid, in combination, the arrangement of a multi-legged centrifuge member having at least two symmetrically disposed legs, and a plurality of stationary contact members, arranged in a contact circle with gaps between adjacent members, said contact member being distributed in such a manner about the periphery of said circle that during rotation up to half the number of liquid jets centrifuged by the legs of said centrifuge member are directed each against one of said contact members, while the remaining jets are directed into gaps between said contact members, the contact member connected to one of said phases being halved and the contact halves being arranged on said circle somewhat displaced from a position exactly opposite each other, thereby imparting to the voltage derived from the converter a high degree of stability, while maintaining the necessary minimum distance between said contact members.

4. In a liquid-jet electric current converter adapted to an even number of voltage phases, having a casing whose bottom portion contains a sump of an electrically conductive liquid, in combination, the arrangement of a multi-legged centrifuge member having four symmetrically disposed legs, and a plurality of stationary contact members, arranged in a contact circle with gaps between adjacent members, said contact members being distributed in such a manner about the periphery of said circle that during rotation up to half the number of liquid jets centrifuged by the legs of said centrifuge member are directed each against one of said contact members, while the remaining jets are directed into gaps between said contact members, the gaps between adjacent contact members on the periphery of said circle being at least twice as wide as said contact members, thereby imparting to the voltage derived from the converter a high degree of stability, while maintaining the necessary minimum distance between said contact members.

5. In a liquid-jet electric current converter, having a casing whose bottom portion contains a sump of an electrically conductive liquid, in combination, the arrangement of a multi-legged centrifuge member having three symmetrically disposed legs, and a plurality of stationary contact members, arranged in a contact circle with gaps between adjacent members with the gap between adjacent contact members being at least equal in width to that of said contact members, said contact members being distributed in such a manner about the periphery of said circle that during rotation up to half the number of liquid jets centrifuged by the legs of said centrifuge member are directed each against one of said contact members, while the remaining jets are directed into gaps between said contact members, thereby imparting to the voltage derived from the converter a high degree of stability, while maintaining the necessary minimum distance between said contact members.

6. In a liquid-jet electric current converter, having a casing whose bottom portion contains a sump of an electrically conductive liquid, in combination, the arrangement of a multi-legged centrifuge member having several symmetrically disposed legs, and a plurality of stationary contact members, arranged in a contact circle with gaps between adjacent members, there being gaps having half the width of a contact member between every two contact members which are connected to voltage phases that are distinguished from each other by half the phase number, said contact members being distributed in such a manner about the periphery of said circle that during rotation up to half the number of liquid jets centrifuged by the legs of said centrifuge member are directed each against one of said contact members, while the remaining jets are directed into gaps between said contact members, thereby imparting to the voltage derived from the converter a high degree of stability, while maintaining the necessary minimum distance between said contact members.

7. In a liquid-jet electric current converter, having a casing whose bottom portion contains a sump of an electrically conductive liquid, in combination, the arrangement of a multi-legged centrifuge member having several symmetrically disposed legs, a plurality of stationary contact members, arranged in a contact circle with gaps between adjacent members, said contact members being distributed in such a manner about the periphery of said circle that during rotation up to half the number of liquid jets centrifuged by the legs of said centrifuge member are directed each against one of said contact members, while the remaining jets are directed into gaps between said contact members, thereby imparting to the voltage derived from the converter a high degree of stability, while maintaining the necessary minimum distance between said contact members and fastening means provided for said contact members, said fastening means being distributed symmetrically about the periphery of said circle, said contact members being mounted asymmetrically on said fastening means.

References Cited in the file of this patent

UNITED STATES PATENTS

| | | |
|---|---|---|
| 688,068 | Cunningham | Dec. 3, 1901 |
| 1,390,504 | Corbino | Sept. 13, 1921 |
| 1,607,141 | Wappler | Nov. 16, 1926 |
| 2,144,421 | Wangemann | Jan. 17, 1939 |
| 2,444,687 | Widakowich | July 6, 1948 |
| 2,782,273 | Davis et al. | Feb. 19, 1957 |